(12) United States Patent
Hattori

(10) Patent No.: US 10,613,462 B2
(45) Date of Patent: Apr. 7, 2020

(54) IMAGE DISPLAY APPARATUS, AND METHOD AND COMPUTER-READABLE MEDIUM FOR THE SAME

(71) Applicant: BROTHER KOGYO KABUSHIKI KAISHA, Nagoya, Aichi (JP)

(72) Inventor: Yuka Hattori, Mizuho (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 113 days.

(21) Appl. No.: 15/715,322

(22) Filed: Sep. 26, 2017

(65) Prior Publication Data

US 2018/0095391 A1 Apr. 5, 2018

(30) Foreign Application Priority Data

Sep. 30, 2016 (JP) .................. 2016-193310

(51) Int. Cl.
*G06F 17/00* (2019.01)
*G03G 15/00* (2006.01)
*G06F 3/0482* (2013.01)
*G06F 3/0485* (2013.01)
*G06F 3/0488* (2013.01)
*G06F 3/041* (2006.01)

(52) U.S. Cl.
CPC ......... *G03G 15/502* (2013.01); *G06F 3/0412* (2013.01); *G06F 3/0416* (2013.01); *G06F 3/0482* (2013.01); *G06F 3/0488* (2013.01); *G06F 3/04855* (2013.01)

(58) Field of Classification Search
CPC .................................................. G06F 3/0416

USPC ................ 715/227, 243, 252, 786, 787, 788
See application file for complete search history.

(56) References Cited

U.S. PATENT DOCUMENTS

| 5,553,225 A * | 9/1996 | Perry .................. G06F 3/04855 345/660 |
| 7,469,381 B2 * | 12/2008 | Ording .................. G06F 3/0485 715/702 |
| 9,035,973 B2 * | 5/2015 | Matsuki ............... G03G 15/502 345/684 |
| 9,619,131 B2 * | 4/2017 | Gardenfors ........... H04L 51/066 |

(Continued)

FOREIGN PATENT DOCUMENTS

JP 2013196573 A 9/2013
JP 2013246615 A 12/2013

*Primary Examiner* — Stephen S Hong
*Assistant Examiner* — Matthew J Ludwig
(74) *Attorney, Agent, or Firm* — Scully Scott Murphy and Presser

(57) ABSTRACT

An image display apparatus includes a controller configured to display N object images within a first display area of a display, the N object images are included in first to M-th object images, in response to a first operation input via the display while the N object images are displayed, determining K object images including the N object images, display the K object images within the first display area, in response to a second operation input via the display while the K object images are displayed, change the K object images to another set of K object images, display the changed K object images within the first display area, in response to a third operation input via the display while the changed K object images are displayed, extracting N object images from among the changed K object images, and display the extracted N object images within the first display area.

18 Claims, 10 Drawing Sheets

(56) References Cited

U.S. PATENT DOCUMENTS

2008/0134078 A1* 6/2008 Han .................. G06F 3/0485
715/784
2013/0314350 A1* 11/2013 Tobinaga ............. G03G 15/502
345/173

* cited by examiner

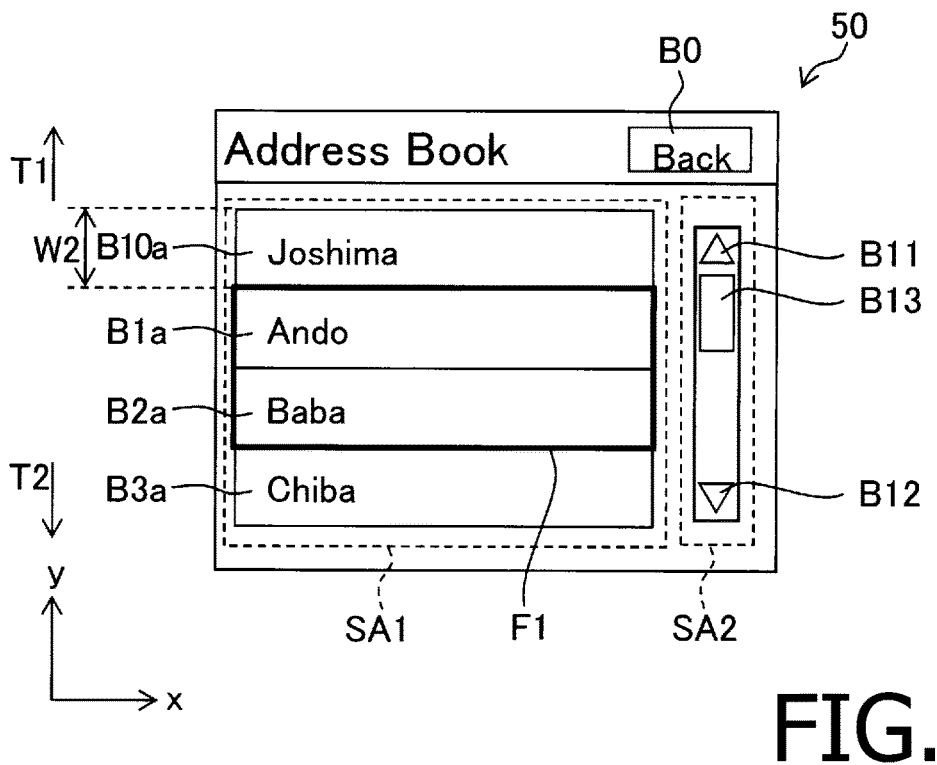

FIG. 7

| | 101 | 102 | 105 TB1 | |
|---|---|---|---|---|
| | LIST NUMBER | NAME | FAX NUMBER | DISPLAY STATE FLAG |
| | 1 | Ando | 052-xxx-xxxx | CURRENTLY DISPLAYED |
| | 2 | Baba | 03-xxx-xxxx | NOT DISPLAYED |
| | 3 | Chiba | 06-xxx-xxxx | NOT DISPLAYED |
| | 4 | Deguchi | 052-xxx-xxxx | NOT DISPLAYED |
| | 5 | Endo | 03-xxx-xxxx | NOT DISPLAYED |
| | 6 | Fujita | 03-xxx-xxxx | NOT DISPLAYED |
| | 7 | Goto | 075-xxx-xxxx | NOT DISPLAYED |
| | 8 | Hasegawa | 052-xxx-xxxx | CURRENTLY DISPLAYED |
| | 9 | Ito | 03-xxx-xxxx | CURRENTLY DISPLAYED |
| | 10 | Joshima | 03-xxx-xxxx | CURRENTLY DISPLAYED |

FIG. 8

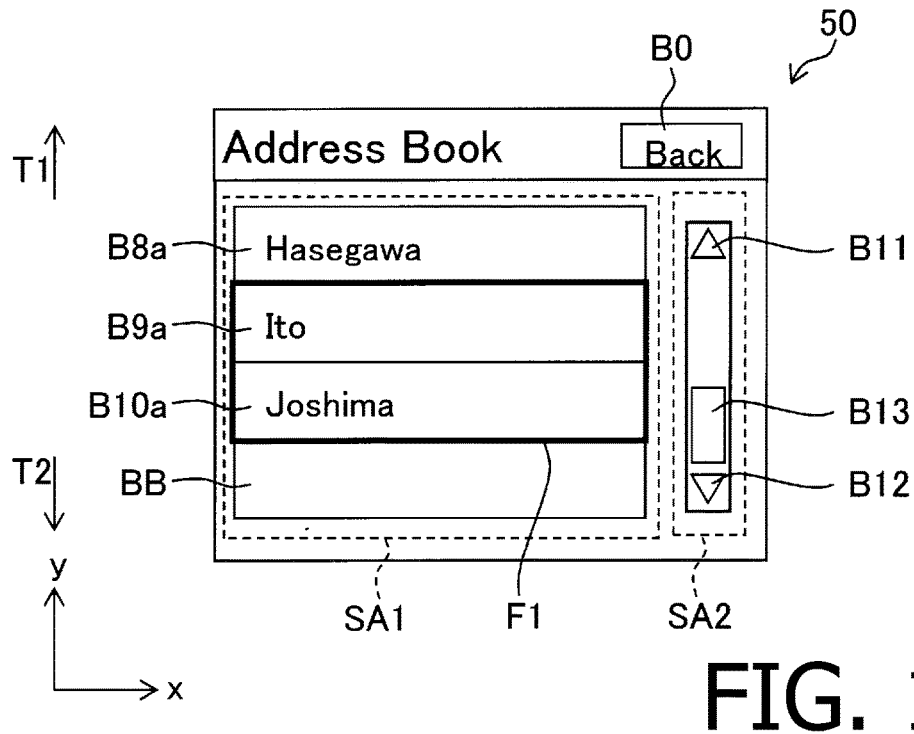

FIG. 11

| LIST NUMBER | NAME | FAX NUMBER | DISPLAY STATE FLAG | |
|---|---|---|---|---|
| 1 | Ando | 052-xxx-xxxx | NOT DISPLAYED | |
| 2 | Baba | 03-xxx-xxxx | NOT DISPLAYED | |
| 3 | Chiba | 06-xxx-xxxx | NOT DISPLAYED | |
| 4 | Deguchi | 052-xxx-xxxx | NOT DISPLAYED | |
| 5 | Endo | 03-xxx-xxxx | NOT DISPLAYED | |
| 6 | Fujita | 03-xxx-xxxx | NOT DISPLAYED | |
| 7 | Goto | 075-xxx-xxxx | CURRENTLY DISPLAYED ⇒ | NOT DISPLAYED |
| 8 | Hasegawa | 052-xxx-xxxx | CURRENTLY DISPLAYED ⇒ | NOT DISPLAYED |
| 9 | Ito | 03-xxx-xxxx | CURRENTLY DISPLAYED | |
| 10 | Joshima | 03-xxx-xxxx | CURRENTLY DISPLAYED | |

FIG. 12

IMAGE DISPLAY APPARATUS, AND METHOD AND COMPUTER-READABLE MEDIUM FOR THE SAME

CROSS-REFERENCE TO RELATED APPLICATION

This application claims priority under 35 U.S.C. § 119 from Japanese Patent Application No. 2016-193310 filed on Sep. 30, 2016. The entire subject matter of the application is incorporated herein by reference.

BACKGROUND

Technical Field

The following description relates to aspects of an image display apparatus for displaying various kinds of images, and a method and a computer-readable medium for the image display apparatus.

Related Art

As a method for displaying many pieces of information on a touch panel, for instance, a scroll display method has been known. For example, there is a case where a list is displayed on the touch panel, including a plurality of types of object images (e.g., icon images and list images) each for accepting an instruction to start executing a corresponding process. In this case, the list is scroll-displayed in response to a drag operation (i.e., an operation of moving a screen with a finger or a stylus kept in touch with the screen) or a flick operation (i.e., an operation of moving a finger or a stylus as lightly sweeping the screen with the finger or the stylus). A screen displayed after the list has been scrolled includes thereon object images different from object images that had been shown on a screen before the scrolling of the list. When a tapping operation (i.e., an operation of pressing an object image on a screen and ending pressing the object image without dragging the object image) is applied to an object image, an instruction to start executing a process associated with the tapped object image is accepted.

SUMMARY

Each object image is required to have a certain size of display area secured for accepting a tapping operation. Nonetheless, as the display area of each object image increases, the number of object images displayable within a single screen image decreases. As the number of object images displayable within a single screen image decreases, the screen needs to be scrolled with a higher frequency, and it is less user-friendly. In particular, aspects of the present disclosure are more advantageous for a touch panel having a smaller screen size.

Aspects of the present disclosure are advantageous to provide one or more improved techniques for an image display apparatus.

According to aspects of the present disclosure, an image display apparatus is provided, which includes a display, a coordinate detector configured to detect indication coordinates, the indication coordinates representing a position that an indicator is in touch with or in proximity to within a display area of the display, and a controller configured to perform a particular process. The particular process includes controlling the display to display N object images continuously arranged in line within a first display area. The first display area is defined within the display area of the display. N is a natural number equal to or more than 2. The N object images are associated with N consecutive numbers, respectively. The N object images are included in first to M-th object images. M is a natural number more than N. The particular process further includes, in response to a first operation being input via the display while the N object images are being displayed, determining K object images including the N object images. K is a natural number more than N. The K object images are associated with K consecutive numbers, respectively. The particular process further includes controlling the display to display the K object images continuously arranged in line within the first display area, in response to a second operation being input via the display while the K object images are being displayed, changing the K object images to another set of K object images, controlling the display to display the changed K object images continuously arranged in line within the first display area, in response to a third operation being input via the display while the K object images or the changed K object images are being displayed, extracting N object images from among the K object images or the changed K object images at a point of time when the third operation is input, controlling the display to display the extracted N object images continuously arranged in line within the first display area, and in response to the coordinate detector detecting a tapping operation of tapping a display area of a specific object image of the N object images or the extracted N object images while the N object images or the extracted N object images are being displayed, performing a specific process associated with the specific object image of which the display area has been tapped.

According to aspects of the present disclosure, further provided is a method implementable on a processor connected with an image display apparatus. The image display apparatus includes a display, and a coordinate detector configured to detect indication coordinates, the indication coordinates representing a position that an indicator is in touch with or in proximity to within a display area of the display. The method includes controlling the display to display N object images continuously arranged in line within a first display area. The first display area is defined within the display area of the display. N is a natural number equal to or more than 2. The N object images are associated with N consecutive numbers, respectively. The N object images are included in first to M-th object images. M is a natural number more than N. The method further includes, in response to a first operation being input via the display while the N object images are being displayed, determining K object images including the N object images. K is a natural number more than N. The K object images are associated with K consecutive numbers, respectively. The method further includes controlling the display to display the K object images continuously arranged in line within the first display area, in response to a second operation being input via the display while the K object images are being displayed, changing the K object images to another set of K object images, controlling the display to display the changed K object images continuously arranged in line within the first display area, in response to a third operation being input via the display while the K object images or the changed K object images are being displayed, extracting N object images from among the K object images or the changed K object images at a point of time when the third operation is input, controlling the display to display the extracted N object images continuously arranged in line within the first display area, and in response to the coordinate detector detecting a tapping operation of tapping a display area of a specific object image of the N object images or the extracted N object images while the N object images or the extracted N object images are being displayed, performing a specific process associated with the specific object image of which the display area has been tapped.

According to aspects of the present disclosure, further provided is a non-transitory computer-readable medium storing computer-readable instructions that are executable by a processor connected with an image display apparatus. The image display apparatus includes a display, and a coordinate detector configured to detect indication coordinates, the indication coordinates representing a position that an indicator is in touch with or in proximity to within a display area of the display. The instructions are configured to, when executed, cause the processor to perform a particular process. The particular process includes controlling the display to display N object images continuously arranged in line within a first display area. The first display area is defined within the display area of the display. N is a natural number equal to or more than 2. The N object images are associated with N consecutive numbers, respectively. The N object images are included in first to M-th object images. M is a natural number more than N. The particular process further includes, in response to a first operation being input via the display while the N object images are being displayed, determining K object images including the N object images. K is a natural number more than N. The K object images are associated with K consecutive numbers, respectively. The particular process further includes controlling the display to display the K object images continuously arranged in line within the first display area, in response to a second operation being input via the display while the K object images are being displayed, changing the K object images to another set of K object images, controlling the display to display the changed K object images continuously arranged in line within the first display area, in response to a third operation being input via the display while the K object images or the changed K object images are being displayed, extracting N object images from among the K object images or the changed K object images at a point of time when the third operation is input, controlling the display to display the extracted N object images continuously arranged in line within the first display area, and in response to the coordinate detector detecting a tapping operation of tapping a display area of a specific object image of the N object images or the extracted N object images while the N object images or the extracted N object images are being displayed, performing a specific process associated with the specific object image of which the display area has been tapped.

BRIEF DESCRIPTION OF THE ACCOMPANYING DRAWINGS

Figure 6:
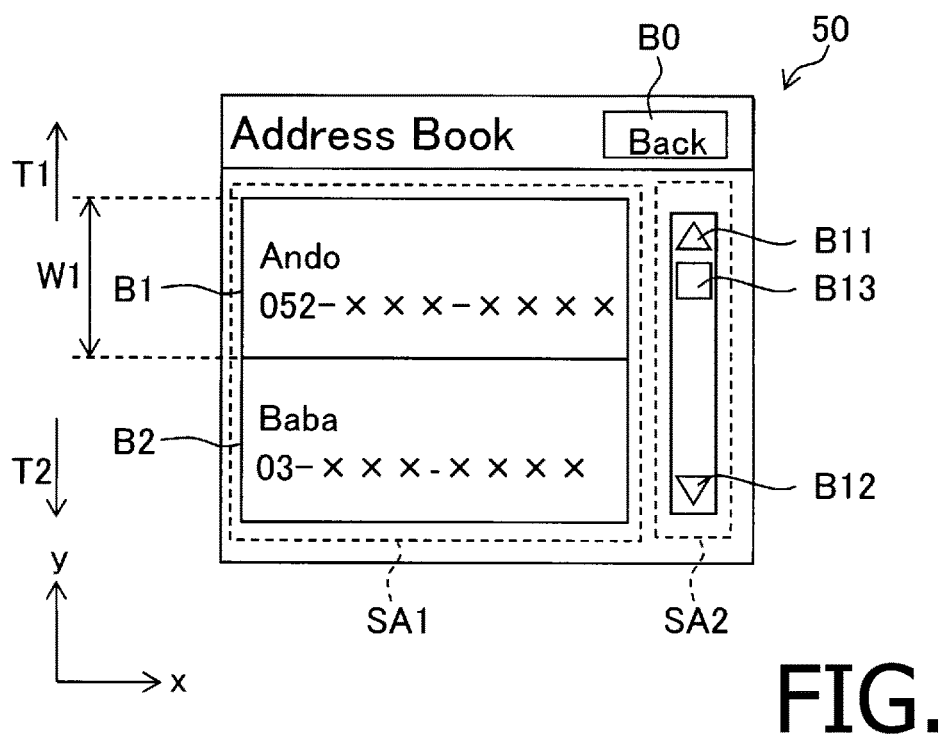

FIG. 6 exemplifies a screen displayed on a panel of the MFP in the illustrative embodiment according to one or more aspects of the present disclosure.

FIG. 7 exemplifies a screen displayed on the panel of the MFP in the illustrative embodiment according to one or more aspects of the present disclosure.

FIG. 8 shows an example of the list image table in the illustrative embodiment according to one or more aspects of the present disclosure.

Figures 9, 10:
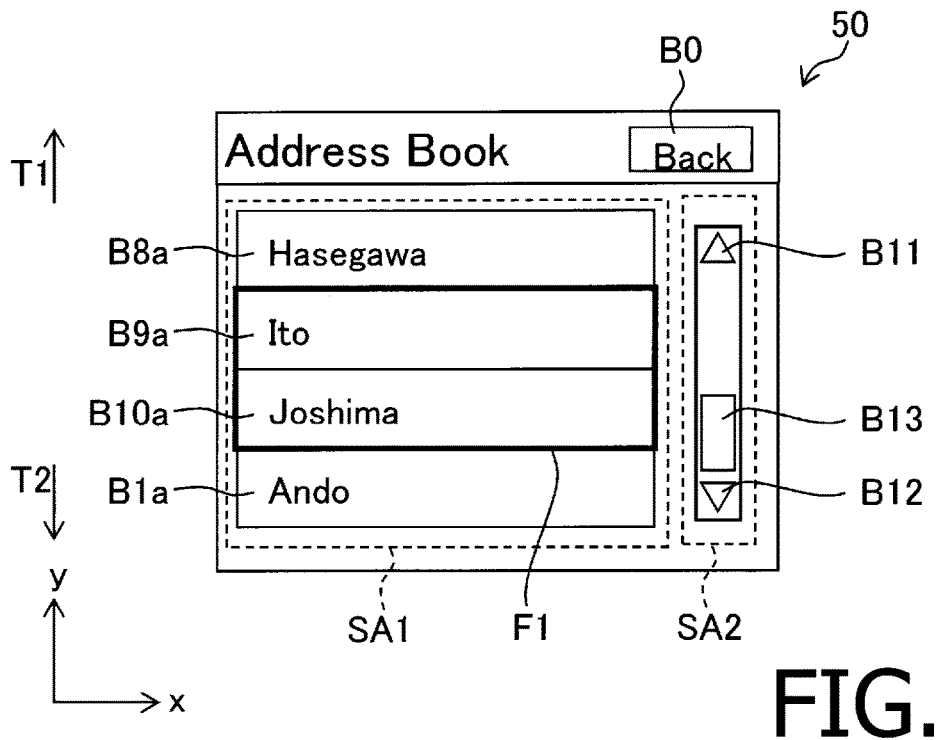

FIG. 9 exemplifies a screen displayed on the panel of the MFP in the illustrative embodiment according to one or more aspects of the present disclosure.

FIG. 10 shows an example of the list image table in the illustrative embodiment according to one or more aspects of the present disclosure.

FIG. 11 exemplifies a screen displayed on the panel of the MFP in the illustrative embodiment according to one or more aspects of the present disclosure.

FIG. 12 shows an example of the list image table in the illustrative embodiment according to one or more aspects of the present disclosure.

Figure 13:
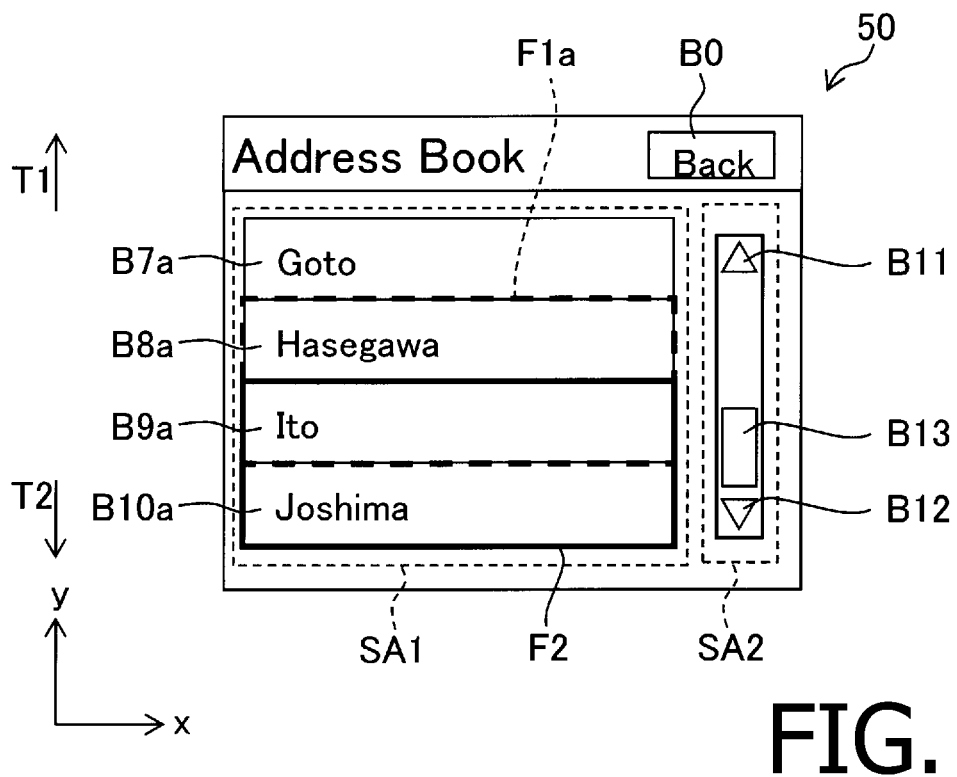

FIG. 13 exemplifies a screen displayed on the panel of the MFP in the illustrative embodiment according to one or more aspects of the present disclosure.

Figure 14:
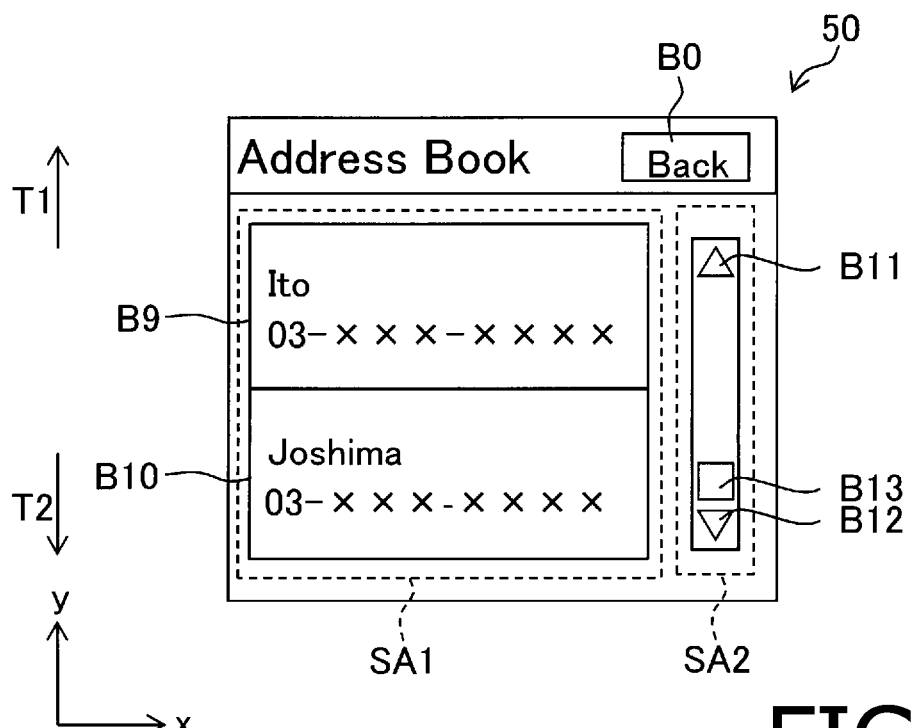

FIG. 14 exemplifies a screen displayed on the panel of the MFP in the illustrative embodiment according to one or more aspects of the present disclosure.

Figure 15:
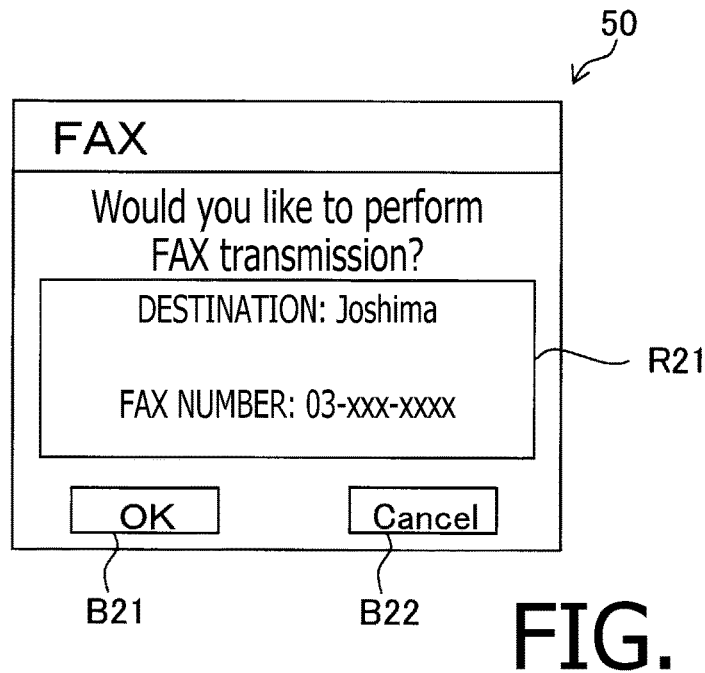

FIG. 15 exemplifies a screen displayed on the panel of the MFP in the illustrative embodiment according to one or more aspects of the present disclosure.

Figure 16:
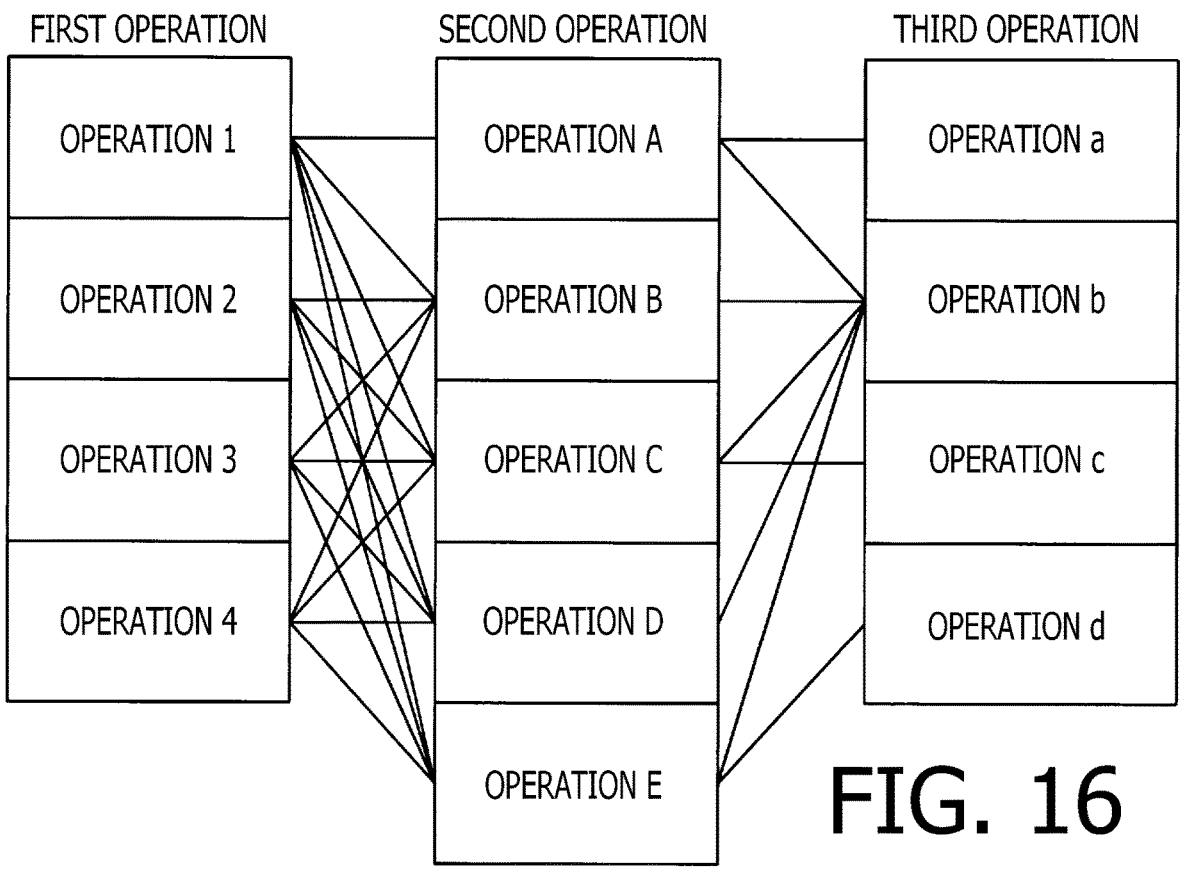

FIG. 16 exemplifies combinations of first to third operations, in accordance with one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

<Illustrative Embodiment>

Figure 1:
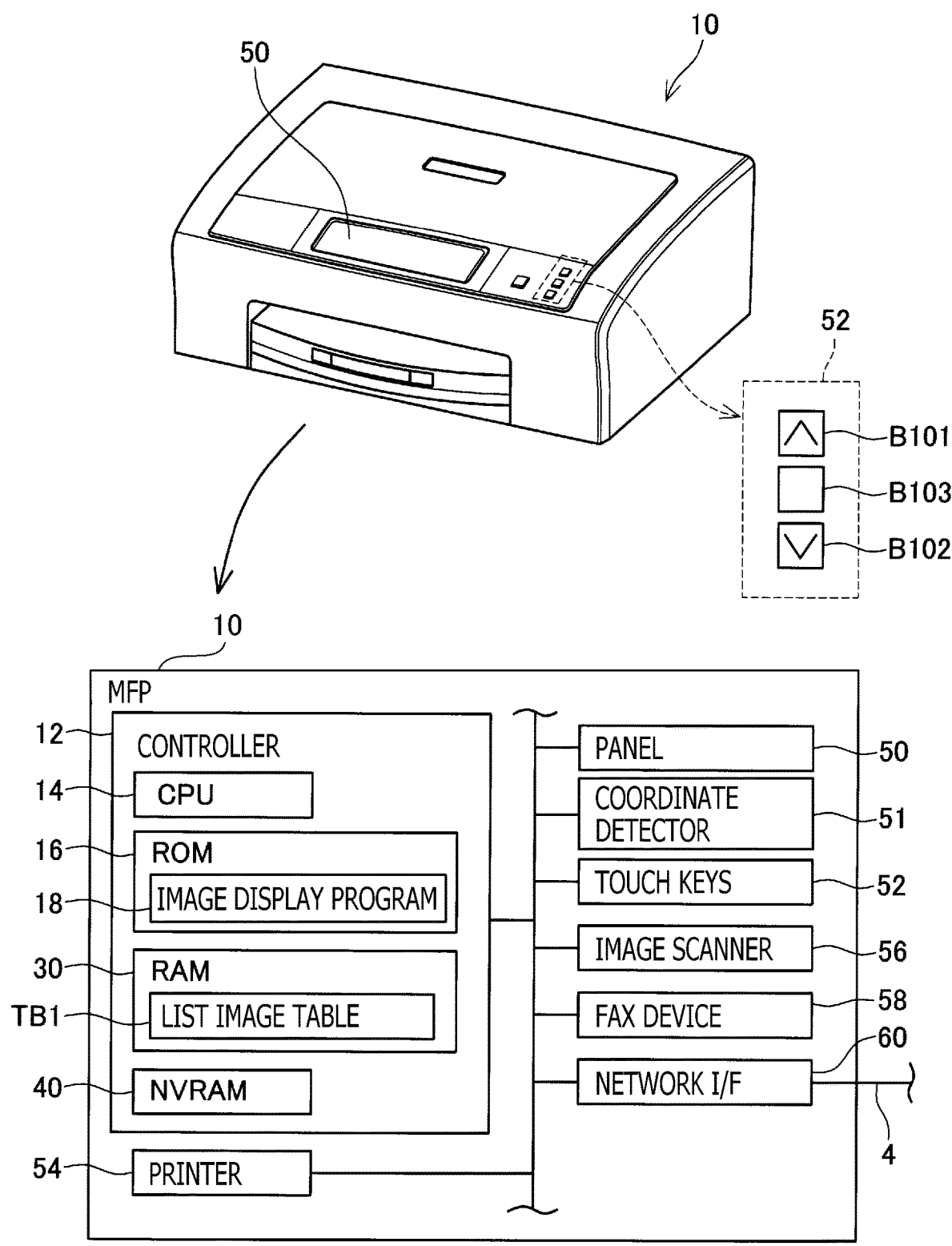
FIG. 1 is a block diagram schematically showing a configuration of a multi-function peripheral (hereinafter referred to as an "MFP") in an illustrative embodiment according to one or more aspects of the present disclosure.

Hereinafter, an illustrative embodiment according to aspects of the present disclosure will be described with reference to the accompanying drawings. FIG. 1 is a block diagram schematically showing an electrical configuration of a multi-function peripheral (hereinafter referred to as an "MFP") 10 in the illustrative embodiment.

<Configuration of MFP>

The MFP 10 of the illustrative embodiment has a plurality of functions such as a printing function, a scanning function, a copy function, a facsimile function, and a telephone function. The MFP 10 includes a controller 12, a panel 50, a coordinate detector 51, touch keys 52, a printer 54, an image scanner 56, a facsimile device 58, and a network interface (hereinafter referred to as a "network I/F") 60. The controller 12 includes a CPU 14, a ROM 16, a RAM 30, and a non-volatile RAM (hereinafter referred to as an "NVRAM") 40.

The CPU 14 is configured to perform various processes in accordance with programs stored in the ROM 16. The processes to be executed by the CPU 14 will be described in detail later. The ROM 16 stores an image display program 18 for controlling basic operations of the MFP 10.

As shown in FIG. 1, a panel 50 is disposed at an upper front portion of the MFP 10. The panel 50 is configured to display various images using an application program interface (hereinafter referred to as an "API") of the image display program 18. In a front view of the panel 50, a left-to-right direction (i.e., a horizontal direction) is defined as an x-direction of the panel 50, and a front-to-rear direction (i.e., a vertical direction) is defined as a y-direction of the panel 50. On a surface of the panel 50, the coordinate detector 51 is disposed to cover the panel 50. The coordinate detector 51 has a transparent plate portion. The coordinate detector 51 is configured to detect indication coordinates. The indication coordinates represent a position that an indicator (e.g., a user's finger and a stylus) is in touch with or in proximity to within a display area of the panel 50. A combination of the panel 50 and the coordinate detector 51 serves as a touch panel.

The touch keys 52 are electrostatic capacitance type touch sensors. The touch keys 52 include an upper key B101, a lower key B102, and a center key B103.

The RAM 30 is a volatile memory. The RAM 30 provides a storage area to store various kinds of data generated during execution of a process according to the image display program 18. The data stored in the RAM 30 includes a loop display flag.

The loop display flag is information that is set to "ON" when list images are loop-displayed and is set to "OFF" when the list images are not loop-displayed. In a case where the loop display flag is "ON," when a plurality of list images are scroll-displayed until a rearmost list image is displayed, a leading list image is next displayed. Meanwhile, when the plurality of list images are scroll-displayed until the leading list image is displayed, the rearmost list image is next displayed. On the other hand, in a case where the loop display flag is "OFF," when the plurality of list images are scroll-displayed until the rearmost list image is displayed, the scrolling is halted. Further, when the plurality of list images are scroll-displayed until the leading list image is displayed, the scrolling is halted. The loop display flag is switched between "ON" and "OFF" depending on a type of the list images. Examples of types of list images include an address book and a menu. As list images of the address book, names and facsimile numbers may be displayed. A user is allowed to select an intended destination of facsimile transmission by scrolling the list images of the address book. As list images of the menu, various processes (e.g., printing, facsimile, copying, and general setting and network setting for the MFP 10) executable by the MFP 10 may be displayed. The user is allowed to select an intended function by scrolling the list images of the menu.

Figure 5:
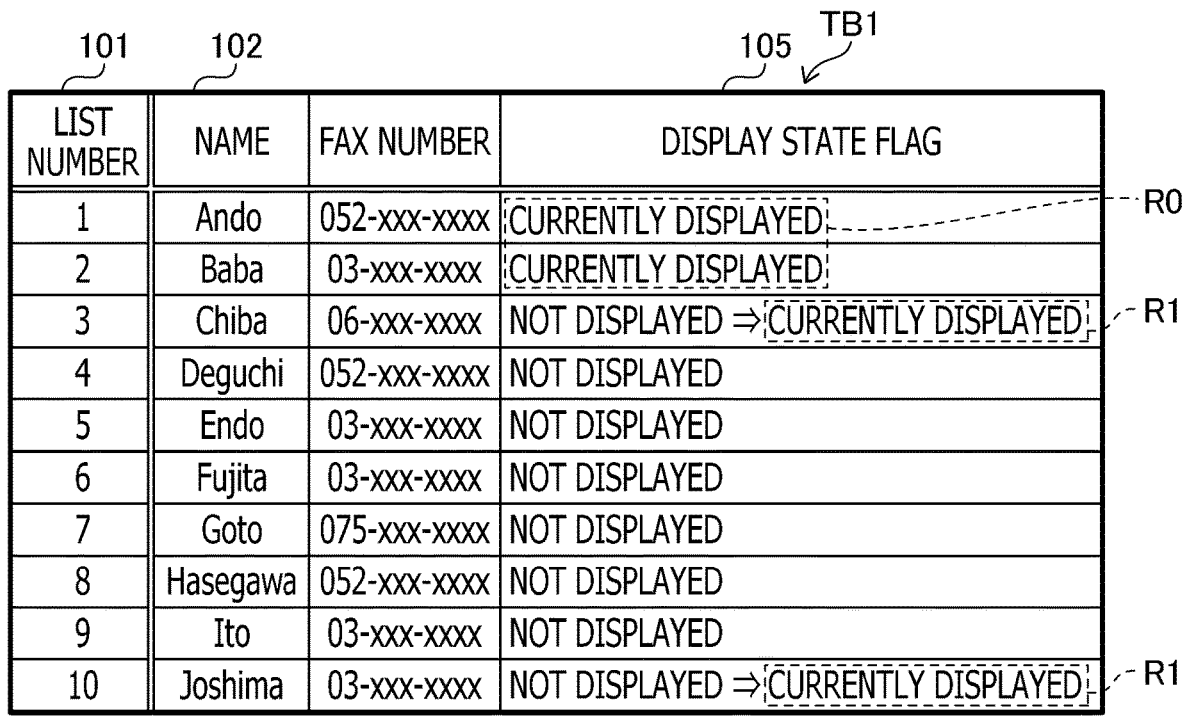
FIG. 5 shows an example of a list image table in the illustrative embodiment according to one or more aspects of the present disclosure.

The NVRAM 40 is a non-volatile memory. In the NVRAM 40, a list image table TB1 is stored. The list image table TB1 is a table storing various kinds of information regarding each of a plurality of list images displayed on the panel 50. FIG. 5 exemplifies the list image table TB1 in the illustrative embodiment. The list image table TB1 exemplified in FIG. 5 is for displaying list images of an address book. The list image table TB1 stores list numbers 101, names 102, facsimile numbers 103, and display state flags 105.

Each of the list numbers 101 is a serial number for identifying a corresponding one of the list images to be displayed on the panel 50. Each name 102 is information indicating a name to be displayed in a corresponding list image. Each of the names 102 is also identification information that identifies the corresponding list image. Each of the facsimile numbers 103 is information indicating a facsimile number to be displayed in a corresponding list image. Each facsimile number 103 is also auxiliary information associated with the corresponding list image. The names 102 and the facsimile numbers 103 are registered by the user of the MFP 10. Each of the display state flags 105 is information indicating whether to display a corresponding list image within a scroll area.

Further, various kinds of information are stored in the NVRAM 40. Examples of the information stored in the NVRAM 40 include a blank list image flag. The blank list image flag is information indicating a process to be executed when list images are scroll-displayed, without being loop-displayed, until a leading one or a rearmost one of the list images is displayed. When the blank list image flag is "ON," a blank list image is displayed added to the leading list image or the rearmost list image of the list images. Meanwhile, when the blank list image flag is "OFF," a blank list image is not displayed added to the leading list image or the rearmost list image of the list images. The blank list image flag is set to "ON" or "OFF" depending on the type of the list images.

The printer 54 is configured to perform printing. The image scanner 56 is configured to scan a document and generate image data based on the scanned image of the document. The facsimile device 58 is configured to transmit and receive image data of a document. The network I/F 60 is connected with a wired LAN line 4. The network I/F 60 is configured to transmit and receive various kinds of data.

<Operations of MFP>

Figure 2:
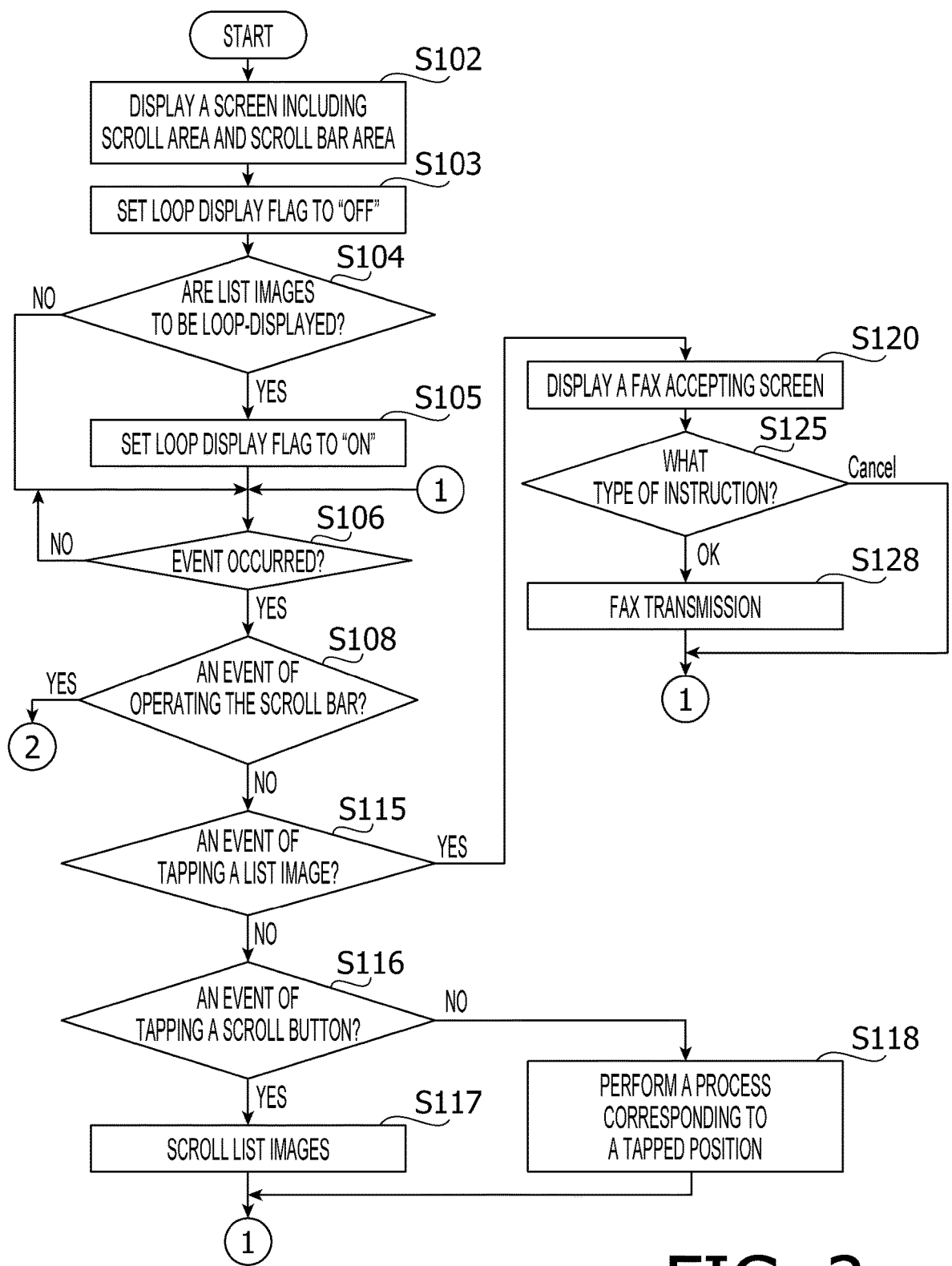
FIGS. 2 to 4 are flowcharts showing a procedure of a scroll process to be performed by the MFP, in the illustrative embodiment according to one or more aspects of the present disclosure.
Figure 3:
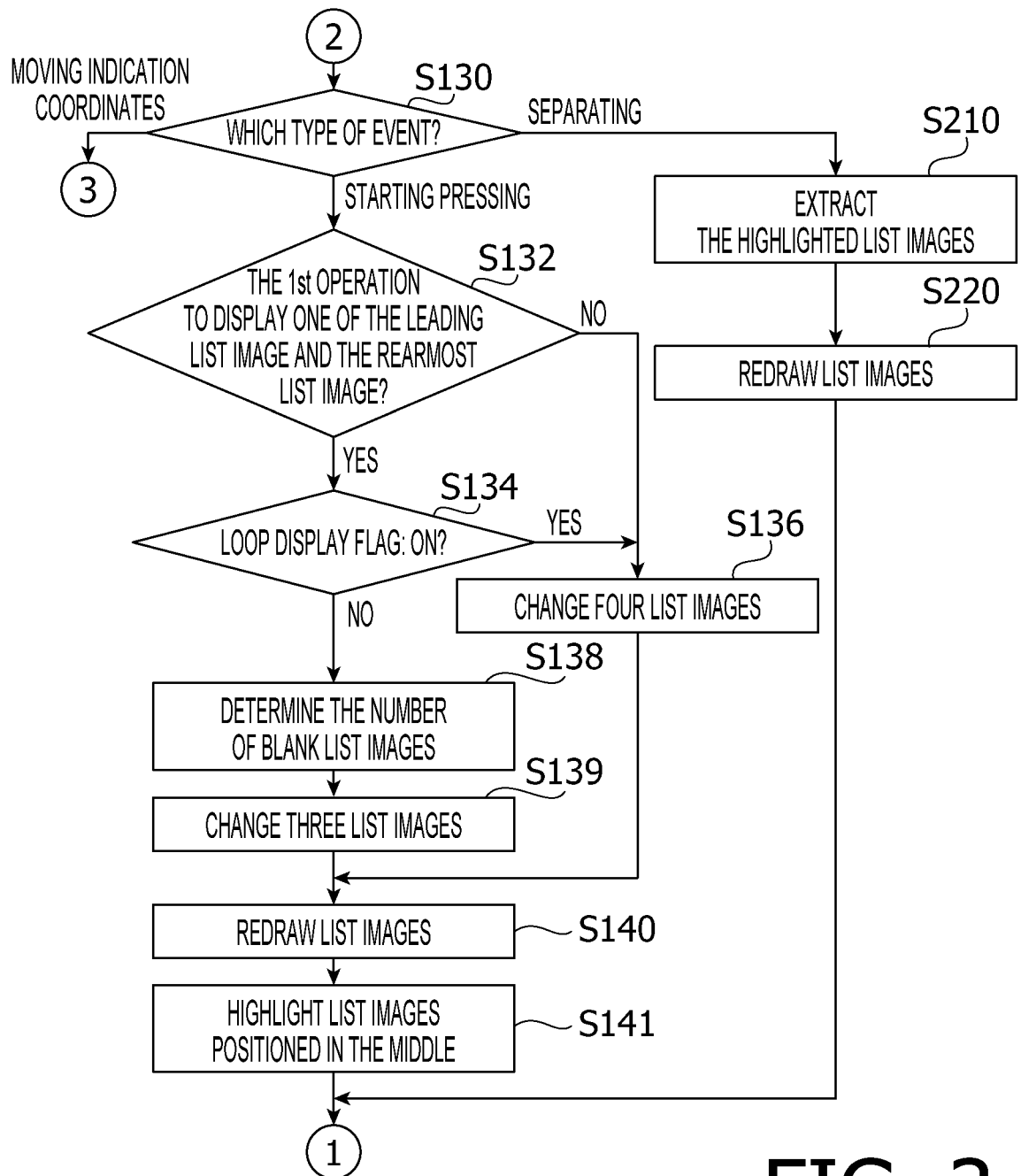
Figure 4:
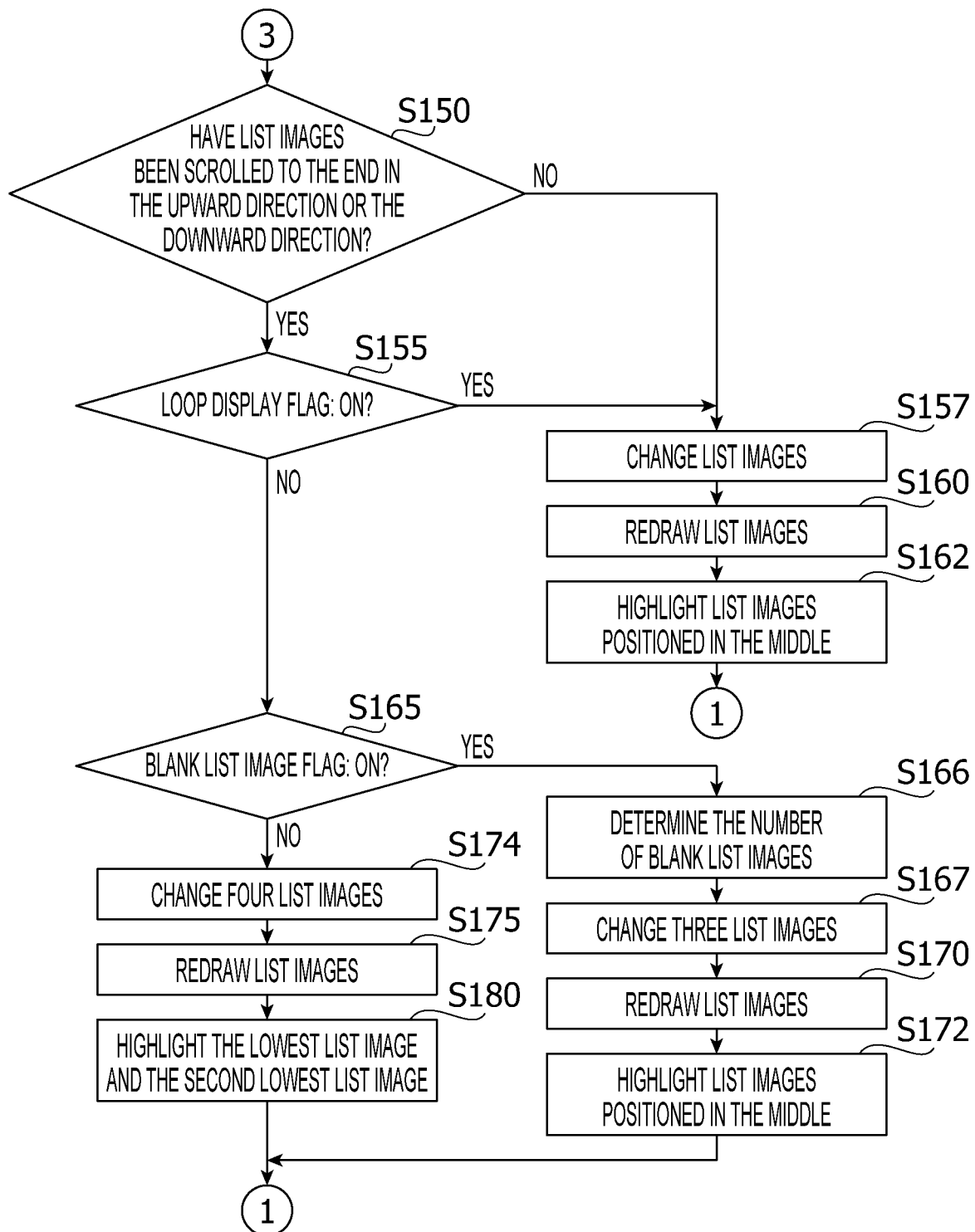

Operations of the MFP 10 will be described with reference to FIGS. 2 to 4. FIGS. 2 to 4 are flowcharts showing a procedure of a scroll process. The scroll process is started in response to the MFP 10 being turned on, and continues to be performed until the MFP 10 is turned off.

In S102, the CPU 14 controls the panel 50 to display a screen image including a scroll area SA1.

FIG. 6 shows an example of a screen displayed on the panel 50. The screen exemplified in FIG. 6 is based on the list image table TB1 shown in FIG. 5. In the example of the screen shown in FIG. 6, a scroll area SA1 and a scroll bar SA2 are displayed on the panel 50. As shown in an area R0 of the list image table TB1 in FIG. 5, each of the display state flags 105 associated with the list numbers 101 equal to "1" and "2" is set to "currently displayed." Hence, in the scroll area SA1 in FIG. 6, two list images B1 and B2 are displayed in a state arranged continuously in line along the y-direction (i.e., the vertical direction). The scroll area SA1 is an area in which list images are enabled to be scroll-displayed in an upward direction T1 or a downward direction T2 along the y-direction in which the list images B1 and B2 are arranged.

The list image B1 is displayed based on information registered in a field of the list number 101 of "1" on the list image table TB1 (see FIG. 5). The list image B1 is displayed with two lines. In the first line, the name 102 is displayed. In the second line, the facsimile number 103 is displayed. Further, the list image B2 is displayed based on information registered in a field of the list number 101 of "2" on the list image table TB1.

In the scroll bar area SA2, an upward scroll button B11, a downward scroll button B12, and a scroll bar B13 are displayed. The upward scroll button B11 is a button image for accepting an instruction to scroll images in the upward direction T1. The downward scroll button B12 is a button image for accepting an instruction to scroll images in the downward direction T2. The scroll bar B13 is an image showing an association between the two list images currently displayed in the scroll area SA1 and 10 pieces of information stored on the list image table TB1 (see FIG. 5).

Further, on the screen exemplified in FIG. 6, a back button B0 is displayed. The back button B0 is a button image for accepting an instruction to display a previous screen that has been displayed until the screen shown in FIG. 6 is displayed.

In S103, the CPU 14 resets the loop display flag stored in the RAM 30 to "OFF." In S104, the CPU 14 determines whether list images are to be loop-displayed. Specifically, when list images of an address book are displayed in the scroll area SA1, the CPU 14 determines that the list images are to be loop-displayed. Meanwhile, when list images of a menu are displayed in the scroll area SA1, the CPU 14 determines that the list images are not to be loop-displayed. When determining that the list images are not to be loop-displayed (S104: No), the CPU 14 goes to S106. When determining that the list images are to be loop-displayed (S104: Yes), the CPU 14 goes to S105. In S105, the CPU 14 sets the loop display flag to "ON." Then, the CPU 14 goes to S106.

In S106, the CPU 14 acquires an event (hereinafter, which may be also referred to as a "message"). The event is a signal that is transmitted to the image display program 18 when an action (e.g., an input of the indication coordinates into the coordinate detector 51) arises to execute the image display program 18.

In S108, the CPU 14 determines whether the acquired event is an event of operating the scroll bar B13 on the touch panel (i.e., the combination of the panel 50 and the coordinate detector 51). Specifically, the CPU 14 determines whether the indication coordinates have been detected within the display area of the scroll bar B13. When determining that the acquired event is an event of operating the scroll bar B13 on the touch panel (S108: Yes), the CPU 14 goes to S130 (see FIG. 3).

In S130, the CPU 14 determines which type of event the acquired event is. There are three types of events, which are first to third operations. The first operation is a trigger operation to increase the number of list images displayable in the scroll area SA1 from 2 to 4. The second operation is an operation to scroll list images after the number of list images displayable in the scroll area SA1 has been increased (S140). The third operation is an operation to restore the number of list images displayable in the scroll area SA1 from 4 to 2.

Each of the first to third operations may be various types of operations. In the illustrative embodiment, an explanation will be provided about a case where the first operation is an event of "starting pressing," the second operation is an event of "moving indication coordinates," and the third operation is an event of "separating." The event of "starting pressing" as the first operation is an event to be acquired when an operation of pressing the scroll bar B13 is started. Specifically, the event of starting pressing" is acquired in response to detection of the indication coordinates within the display area of the scroll bar B13 being started. The event of "moving indication coordinates" as the second operation is an event to be acquired when movement of the indication coordinates in the directions (i.e., the upward direction T1 and the downward direction T2) in which list images are allowed to be scrolled is detected. The event of "separating" as the third operation is an event to be acquired when the indicator is separated away from the surface of the panel 50. For instance, the event of "separating" may be acquired in response to a transfer being made from a state where the indication coordinates are detected to a state where the indication coordinates are not detected.

When determining that the acquired event is the event of "starting pressing" (S130: Starting Pressing), the CPU 14 determines that the first operation has been input, and goes to S132. In S132, the CPU 14 determines whether the first operation has been input to display one of the leading list image and the rearmost list image. More specifically, in the example of the list image table TB1 shown in FIG. 5, the CPU 14 determines whether the first operation has been input to display the list image associated with the list number 101 of "1" or "10." When determining that the first operation has not been input to display the leading list image or the rearmost list image (S132: No), the CPU 14 goes to S136. Meanwhile, when determining that the first operation has been input to display the leading list image or the rearmost list image (S132: Yes), the CPU 14 goes to S134.

In S134, the CPU 14 determines whether the loop display flag is "ON." When determining that the loop display flag is "ON" (S134: Yes), the CPU 14 goes to S136.

In S136, the CPU 14 changes target list images to be displayed within the scroll area SA1 from the currently-displayed list images to another set of list images. Specifically, the CPU 14 determines four list images associated with four consecutive list numbers 101 that include the currently-displayed two list images. As shown in the area R0 of the list image table TB1 in FIG. 5, each of the display state flags 105 associated with the list numbers 101 equal to "1" and "2" is set to "currently displayed." Accordingly, the display state flag 105 associated with the list number 101 of "3" continuously following the list number 101 of "2" is changed from "not displayed" to "currently displayed" (see a corresponding area R1). Further, since the loop display flag is "ON," the list number 101 of "10" is selected as a number continuously preceding the list number 101 of "1." Hence, the display state flag 105 associated with the list number 101 of "10" is changed from "not displayed" to "currently displayed" (see a corresponding area R1). Then, the CPU 14 goes to S140.

Meanwhile, when determining that the loop display flag is "OFF" (S134: No), the CPU 14 goes to S138. In S138, the CPU 14 determines the number of blank list images. Specifically, the number of blank list images is determined to be one by dividing, by two, a number obtained by subtracting the number (i.e., two) of the list images displayable before the scroll bar B13 is touched from the number (i.e., four) of the list images displayable after the scroll bar B13 has been touched.

In S139, the CPU 14 changes the target list images to be displayed within the scroll area SA1 from the currently-displayed list images to another set of list images. In the following description of the illustrative embodiment, an explanation will be provided about a changing process to change the list images displayed within the scroll area SA1 when list images are scrolled to a terminal end in the downward direction T2. FIG. 10 shows the list image table TB1 after the target list images to be displayed within the scroll area SA1 have been changed. On the list image table TB1 shown in FIG. 10, each of the three display state flags 105 associated with the list numbers 101 equal to "8," "9," and "10" has been changed to "currently displayed" (see an area R3). Namely, the list images of which the number (i.e., three) is obtained by subtracting the number (i.e., one) of the blank list image from the number (i.e., four) of the list images that have been displayed until then are brought into a "currently displayed" state. Afterward, the CPU 14 goes to S140.

In S140, the CPU 14 redraws list images within the scroll area SA1. FIG. 7 shows an example of a screen displayed when the loop display flag is "ON." FIG. 7 exemplifies a screen redrawn within the scroll area SA1 based on the list image table TB1 shown in FIG. 5. In the scroll area SA1 in FIG. 7, four list images B10a, B1a, B2a, and B3a are displayed in a state continuously arranged in line along the y-direction (i.e., the vertical direction).

In FIG. 6, a vertical width of each list image when the two list images B1 and B2 are displayed within the scroll area SA1 is defined as a width W1. In FIG. 7, a vertical width of each list image when the four list images B10a, B1a, B2a, and B3a are displayed within the scroll area SA1 is defined as a width W2. The width W2 is half as long as the width W1. Further, in FIG. 6, when the two list images B1 and B2 are displayed, the name 102 and the facsimile number 103 are individually displayed in separate lines, respectively, in each of the list images B1 and B2. Meanwhile, in FIG. 7, when the four list images B10a, B1a, B2a, and B3a are displayed, only the name 102 is displayed in a single line in each of the list images B10a, B1a, B2a, and B3a.

Further, FIG. 11 shows an example of a screen displayed when the loop display flag is "OFF." FIG. 11 exemplifies a screen redrawn within the scroll area SA1 based on the list image table TB1 shown in FIG. 10. In the scroll area SA1 shown in FIG. 11, three list images B8a, B9a, and B10a are displayed in a state continuously arranged in line along the y-direction (i.e., the vertical direction). Furthermore, a single blank list image BB is added beneath the lowest one (i.e., the list image B10a) of the three list images B8a, B9a, and B10a in the vertical direction.

In S141, the CPU 14 visually highlights two list images positioned in a middle portion of the four list images continuously arranged in line along the vertical direction. When the loop display flag is "ON," as exemplified in FIG. 7, the list images B1a and B2a are surrounded by a frame line F1. When the loop display flag is "OFF," as exemplified in FIG. 11, the list images B9a and B10a are surrounded by the frame line F1. Then, the CPU 14 goes back to S106 (see FIG. 2).

Meanwhile, when determining that the acquired event is the event of "moving indication coordinates" (S130: Moving Indication Coordinates), the CPU 14 determines that the second operation has been input, and goes to S150. Specifically, after the user touches the scroll bar B13 with the indicator (S130: Starting Pressing), when the user performs a drag operation of moving the indicator along the vertical direction of the panel 50 while keeping the indicator in touch with the surface of the panel 50, the CPU 14 determines that the event of "moving indication coordinates" has occurred.

In S150, the CPU 14 whether list images have been scrolled to a terminal end in the upward direction T1 or the downward direction T2. Specifically, the CPU 14 determines whether the scroll area SA1 has been brought into a state where the scroll area SA1 displays therein the list image associated with the list number 101 of "1" or "10" on the list image table TB1 (see FIG. 5). When determining that list images have not been scrolled to the terminal end in the upward direction T1 or the downward direction T2 (S150: No), the CPU 14 goes to S157. Meanwhile, when determining that list images have been scrolled to the terminal end in the upward direction T1 or the downward direction T2 (S150: Yes), the CPU 14 goes to S155. In S155, the CPU 14 determines whether the loop display flag is "ON." When determining that the loop display flag is "ON" (S155: Yes), the CPU 14 goes to S157.

In S157, the CPU 14 changes four target list images to be displayed within the scroll area SA1 from the currently-displayed list images to another set of list images. The changed list images are determined in accordance with a moving amount of the indication coordinates detected in S130. In the following description of the illustrative embodiment, an explanation will be provided about a changing process to change the list images displayed within the scroll area SA1 when the indication coordinates are moved in the downward direction T2 in FIG. 7. On the list image table TB1 shown in FIG. 5 before the list images displayed within the scroll area SA1 are changed, each of the four display state flags 105 associated with the list numbers 101 equal to "10," "1," "2," and "3" is "currently displayed." Then, on the list image table TB1 shown in FIG. 8 after the list images displayed within the scroll area SA1 have been changed, each of the four display state flags 105 associated with the list numbers 101 equal to "8," "9," "10," and "1" is set to "currently displayed" (see areas R2).

In S160, the CPU 14 redraws list images within the scroll area SA1. FIG. 9 exemplifies a screen redrawn within the scroll area SA1 based on the list image table TB1 shown in FIG. 8. In the scroll area SA1 shown in FIG. 9, the four list images B8a, B9a, B10a, and B1a are displayed in a state continuously arranged in line along the y-direction (the vertical direction). In S162, the CPU 14 visually highlights two list images positioned in the middle portion of the four list images in the y-direction. In the illustrative embodiment, as exemplified in FIG. 9, the list images B9a and B10a are surrounded by the frame line F1. Then, the CPU 14 goes back to S106 (see FIG. 2).

Meanwhile, when determining that the loop display flag is not "ON" (S155: No), the CPU 14 goes to S165. In S165, the CPU 14 determines whether the blank list image flag is "ON." When determining that the blank list image flag is "ON" (S165: Yes), the CPU 14 goes to S166.

The steps S166 and S167 are substantially the same as the aforementioned steps S138 and S139, respectively. Therefore, explanations of S166 and S167 will be omitted.

In S170, the CPU 14 redraws list images within the scroll area SA1. The step S170 is substantially the same as the aforementioned step S140. Therefore, an explanation of S170 will be omitted. In S170, a screen as exemplified in FIG. 11 is displayed based on the list image table TB1 shown in FIG. 10. In the scroll area SA1 exemplified in FIG. 11, the three list images B8a, B9a, and B10a are displayed in a state continuously arranged in line along the y-direction (i.e., the vertical direction). Further, the single blank list image BB is added beneath the lowest one (i.e., the list image B10a) of the three list images B8a, B9a, and B10a in the vertical direction.

In S172, the CPU 14 visually highlights two list images displayed in the middle portion of the scroll area SA1 in the y-direction. In the illustrative embodiment, as exemplified in FIG. 11, the list images B9a and B10a are surrounded by the frame line F1. Then, the CPU 14 goes back to S106 (see FIG. 2).

Meanwhile, when determining that the blank list image flag is not "ON" (S165: No), the CPU 14 goes to S174. In S174, the CPU 14 changes the target list images to be displayed within the scroll area SA1 from the currently-displayed list images to another set of list images. In the following description of the illustrative embodiment, an explanation will be provided about a changing process to change the list images displayed within the scroll area SA1 when list images are scrolled to the terminal end in the downward direction T2. FIG. 12 shows the list image table TB1 after the list images displayed within the scroll area SA1 have been changed. On the list image table TB1 shown in FIG. 12, each of the four display state flags 105 associated with the list numbers 101 equal to "7," "8," "9," and "10" is "currently displayed."

In S175, the CPU 14 redraws list images within the scroll area SA1. FIG. 13 exemplifies a screen redrawn within the scroll area SA1 based on the list image table TB1 shown in FIG. 12. In the scroll area SA1 shown in FIG. 13, four list images B7a, B8a, B9a, and B10a are displayed in a state continuously arranged in line along the y-direction (i.e., the vertical direction).

In S180, the CPU 14 visually highlights the lowest list image and the second lowest list image in the vertical direction. In the illustrative embodiment, as exemplified in FIG. 13, the list images B9a and B10a are surrounded by a frame line F2. Thereby, it is possible to change a frame position from a state where the frame line F1 is positioned in a middle portion of the scroll area SA1 in the y-direction (see FIG. 7) to a state where the frame line F2 is positioned in a lower end portion of the scroll area SA1 (see FIG. 13). Afterward, the CPU 14 goes back to S106 (see FIG. 2).

Meanwhile, when determining that the acquired event is the event of "separating" (S130: Separating), the CPU 14 determines that the third operation has been input, and goes to S210. Specifically, in response to the indicator being separated away from the scroll bar B13, the CPU 14 determines that the event of "separating" has occurred.

In S210, the CPU 14 extracts visually-highlighted two list images from among four object images displayed at a point of time when the separation of the indicator from the scroll bar B13 has been detected in S130. Thereby, it is possible to restore the number of list images displayed within the scroll area SA1. A specific example will be described with reference to FIGS. 12 and 13. As shown in an area R11 of the list image table TB1 exemplified in FIG. 12, the display state flags 105 associated with the list numbers 101 equal to "7," "8," "9," and "10" are set to "currently displayed." Further, as shown in FIG. 13, the list images B9a and B10a are surrounded by the frame line F2. Accordingly, the display state flags 105 associated with the list numbers "7" and "8" of which the list images B7a and B8a are not visually highlighted are changed from "currently displayed" to "not displayed" (see an area R12). Then, the CPU 14 goes to S220.

In S220, the CPU 14 redraws list images within the scroll area SA1. FIG. 14 exemplifies a screen redrawn within the scroll area SA1. The screen shown in FIG. 14 is an example where the number of list images displayed within the scroll area SA1 is restored to two. In the scroll area SA1 exemplified in FIG. 14, the two list images B9 and B10, which had been surrounded by the frame line F2 until S210 was executed, are displayed in a state continuously arranged in line along the y-direction (i.e., the vertical direction). Further, in the scroll area SA1 exemplified in FIG. 14, the list images B9 and B10 are not surrounded by a frame line. In other words, the list images B9 and B10 are not visually highlighted. Afterward, the CPU 14 goes back to S106.

Meanwhile, when determining that the acquired event is not an event of operating the scroll bar B13 on the touch panel (S108: No), the CPU 14 goes to S115.

In S115, the CPU 14 determines whether the acquired event is an event of tapping a list image on the touch panel. Specifically, the CPU 14 determines whether the indication coordinates have become undetected after once detected in a display area of one of the two list images displayed within the scroll area SA1. When determining that the acquired event is an event of tapping a list image on the touch panel (S115: Yes), the CPU 14 reads out a name 102 and a facsimile number 103 associated with the tapped list image.

In S120, the CPU 14 controls the panel 50 to display a facsimile accepting screen. FIG. 15 exemplifies the facsimile accepting screen displayed in response to the list image B10 being tapped on the screen shown in FIG. 14. In an area R21 of the facsimile accepting screen shown in FIG. 15, the name 102 and the facsimile number 103 read out in S115 are displayed. Further, on the facsimile accepting screen shown in FIG. 15, an OK button B21 and a Cancel button B22 are displayed. In S125, the CPU 14 determines what type of instruction has been input. When the Cancel button B22 is tapped (S125: Cancel), the CPU 14 goes back to S106. When the OK button B21 is tapped (S125: OK), the CPU 14 goes to S128. In S128, the CPU 14 instructs the facsimile device 58 to perform facsimile transmission using the facsimile number 103 read out in S115. Then, the CPU 14 goes back to S106.

Meanwhile, when determining that the acquired event is not an event of tapping a list image on the touch panel (S115: No), the CPU 14 goes to S116. In S116, the CPU 14 determines whether the acquired event is an event of tapping one of the upward scroll button B11 and the downward scroll button B12. When determining that the acquired event is an event of tapping one of the upward scroll button B11 and the downward scroll button B12 (S116: Yes), the CPU 14 goes to S117. In S117, the CPU 14 scrolls list images displayed within the scroll area SA1 in the upward direction T1 or the downward direction T2 in accordance with the number of tapping operations of tapping the upward scroll button B11 or the downward scroll button B12. Thereafter, the CPU 14 goes back to S106.

Meanwhile, when determining that the acquired event is not an event of tapping one of the upward scroll button B11 and the downward scroll button B12 (S116: No), the CPU 14 goes to S118. In S118, the CPU 14 performs a process corresponding to a tapped position. For instance, on the screen shown in FIG. 14, when a Back button B0 is tapped, a last screen, which has been displayed until the screen of FIG. 14 is displayed, is displayed. Then, the CPU 14 goes back to S106.

<Advantageous Effects>

Advantageous effects provided by the MFP 10 of the illustrative embodiment will be described. When a pressing operation of pressing the scroll bar B13 is started (S130: Starting Pressing), the MFP 10 increases the number of list images displayed within the scroll area SA1 from two to four (S140). At this time, a display area of each list image displayed within the scroll area SA1 is reduced. When a drag operation of dragging the scroll bar B13 is performed, the MFP 10 scroll-displays list images up or down along the y-direction while maintaining the number of list images displayed within the scroll area SA1 equal to four (S160, S170, and S175). When the user has found an intended list image, in response to the indicator being separated away from the scroll bar B13 (S13: Separating), the MFP 10 restores the number of list images displayed within the scroll area SA1 from four to two (S220). At this time, the display area of each list image displayed within the scroll area SA1 is restored (increased) to an original size. When a tapping operation of tapping one of the two list images displayed within the scroll area SA1 is performed (S115: Yes), the MFP 10 sets a facsimile number associated with the tapped list image as a destination, and performs facsimile transmission to the set destination (S128). Thereby, when the user is searching for an intended list image while scrolling list images, the number of list images displayable within the scroll area SA1 is increased. Thus, it is possible to provide a higher visibility in a plane view of the list images and reduce the number of times to switch screens by scrolling the list images. Meanwhile, when the user has found the intended list image and selects the found list image, the display area of each list image displayed within the scroll area SA1 is increased. Thereby, it is possible to make it easier to perform a tapping operation of tapping the intended list image. As described above, it is possible to achieve both a higher visibility in a plane view of the list images and an easier operability for selecting an intended list image.

When restoring the number of list images displayed within the scroll area SA1 from four to two (S130: Separating), the MFP 10 extracts two list images surrounded by a frame line from among four list images displayed within the scroll area SA1 before the scroll area SA1 is not redrawn and displays the extracted two list images within the scroll area SA1 that has been redrawn (S220). Thereby, it is possible to let the user recognize which list images are to be displayed within the scroll area SA1 after the scroll area SA1 is redrawn, among the four list images displayed within the scroll area SA1 that has not yet been redrawn. Thus, it is possible to achieve improved user-friendliness of the MFP 10.

Let us now consider a case where list images are scrolled to the terminal end in the downward direction T2 (S150: Yes), when the loop display flag is "OFF" (S155: No), and the blank list image flag is "OFF" (S165: No). In this case, when two list images positioned in the middle portion of four list images arranged in the y-direction within the scroll area SA1 are displayed to be surrounded by a frame line, it is impossible to surround the lowest list image B10a by the frame line, as exemplified by a frame line F1a in FIG. 13. Thus, when the number of list images displayed within the scroll area SA1 is restored from four to two (S130: Separating), it is impossible to display the list image B10a within the scroll area SA1. However, in the illustrative embodiment, the MFP 10 is configured to, when list images are scrolled to the terminal end in the downward direction T2, further move the position of the frame line in the downward direction T2, as shown by the frame line F2 in FIG. 13. Thereby, it is possible to surround the lowest list image B10a by the frame line. Thus, even when the number of list images displayed within the scroll area SA1 is restored to two, it is possible to display the list image B10a within the scroll area SAE Let us now consider a case where list images are scrolled to the terminal end in the downward direction T2 (S150: Yes) when the loop display flag is "OFF" (S155: No). In this case, when the blank list image flag is "ON" (S165: Yes), as shown in FIG. 11, the MFP 10 displays the lowest list image B10a in the third position from the top and displays a blank list image BB in the fourth position from the top within the scroll area SA1. Thereby, when two list images positioned in the middle portion of four list images arranged in the y-direction within the scroll area SA1 are displayed to be surrounded by a frame line, it is possible to surround the lowest list image B10a by the frame line, as shown by the frame line F1 in FIG. 11. Thus, when the number of list images displayed within the scroll area 51 is restored to two, it is possible to display the list image B10a within the scroll area SAE The MFP 10 is configured to, in response to the indicator being brought into contact with the scroll bar B13 (S130: Starting Pressing), increase the number of list images displayable within the scroll area SA1 from two to four (S140). The case where the indicator is brought into contact with the scroll bar B13 is considered as a case where the user starts scrolling list images to search for an intended list image. Accordingly, the MFP 10 is allowed to increase the number of list images displayed within the scroll area SA1 substantially at the same time when the user starts scrolling list images. Namely, the MFP 10 is allowed to understand a user's intention and change the number of list images displayed within the scroll area SA1 in accordance with the user's intension. Thus, it is possible achieve improved user-friendliness of the MFP 10.

The MFP 10 is configured to, in response to the indicator being separated away from the scroll bar B13 (S130: Separating), restore the number of list images displayed within the scroll area SA1 from four to two (S220). The case where the indicator is separated away from the scroll bar B13 is considered as a case where the user has found an intended list image and is about to tap the found list image. Accordingly, the MFP 10 is allowed to increase the display area of the intended list image substantially at the same time when the user is about to tap the intended list image. Namely, the MFP 10 is allowed to understand a user's intention and change the display area of the intended list image in accordance with the user's intension. Thus, it is possible achieve improved user-friendliness of the MFP 10.

When displaying two list images within the scroll area SA1, as shown in FIG. 6, the MFP 10 individually displays the name 102 and the facsimile number 103 in separate lines, respectively, in each list image. Thereby, the user is allowed to identify a facsimile destination from the name 102 and confirm the facsimile number 103 associated with the name 102. Further, when displaying four list images within the scroll area SA1, as shown in FIG. 7, the MFP 10 displays only the name 102 in each list image. Hence, the MFP 10 is allowed to restrict information displayed in each list image to minimum information required for identifying a facsimile destination. Thus, it is possible to reduce the size of each list image displayed within the scroll area SA1 and thereby increase the number of list images displayable within the scroll area SA1.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

<First Modification>
The first to third operations are not limited to those exemplified in the aforementioned illustrative embodiment. For instance, each of the first to third operations may be a combination of various types of operations. Referring to FIG. 16, first to third operations in a first modification will be described.

For instance, the first operation in the first modification may be any of the following operations 1 to 4. The operation 1 is touching the scroll bar B13. The operation 2 is pressing, for a long time, one of the upward scroll button B11 and the downward scroll button B12. The operation 3 is touching an area in which there is no button image displayed, outside the display areas of the scroll area SA1 and the scroll bar area SA2. The operation 4 is touching the center key B103 shown in FIG. 1.

For instance, the second operation in the first modification may be any of the following operations A to E. The operation A is touching the scroll bar B13 and then dragging the scroll bar B13 while keeping the indicator in touch with the surface of the panel 50. The operation B is separating the indicator away from the surface of the panel 50 after performing the first operation, and then dragging the scroll bar B13. The operation C is separating the indicator away from the surface of the panel 50 after performing the first operation, and then touching one of the upward scroll button B11 and the downward scroll button B12. The operation D is separating the indicator away from the surface of the panel 50 after performing the first operation, and then performing a flick operation along the vertical direction within the scroll area SA1. The operation E is separating the indicator away from the surface of the panel 50 after performing the first operation, and then touching one of the upper key B101 and the lower key B102.

For instance, the third operation in the first modification may be any of the following operations a to d. The operation a is dragging the scroll bar B13 and then separating the indicator away from the surface of the panel 50. The operation b is separating the indicator away from the surface of the panel 50 after performing the second operation, and then tapping a position close to a display area of an intended one of four list images displayed within the scroll area SA1. The operation c is touching one of the upward scroll button B11 and the downward scroll button B12 and then separating the indicator away from the surface of the panel 50. The operation d is touching one of the upper key B101 and the lower key B102 and then separating the indicator away from the surface of the touch keys 52.

In the aforementioned illustrative embodiment, as a combination of the first to third operations, a combination of the operation 1, the operation A, and the operation a is used. Nonetheless, various combinations may be used as the combination of the first to third operations. FIG. 16 shows feasible combinations by connecting operations via solid lines. As shown in FIG. 16, there are so many combinations feasible as the combination of the first to third operations.

In order to implement each combination of the first to third operations exemplified in FIG. 16, for instance, the following modifications may be made to the aforementioned illustrative embodiment. In S106, an operation of the touch keys 52 may be acquired as the action, as well as an operation of the panel 50. When determining that an event has occurred (S106: Yes), the CPU 14 may go to S130. In S130, when one of the aforementioned operations 1 to 4 is detected, the CPU 14 may determine that the first operation has been performed, and may go to S132. Further, in S130, when one of the aforementioned operations A to E is detected, the CPU 14 may determine that the second operation has been performed, and may go to S150. Further, in S130, when one of the aforementioned operations a to d is detected, the CPU 14 may determine that the third operation has been performed, and may go to S210.

For instance, a combination of the operation 2, the operation D, and the operation b may be used as the combination of the first to third operations. In this case, by pressing one of the upward scroll button B11 and the downward scroll button B12 for a long time, it is possible to increase the number of list images displayed within the scroll area SA1 from two to four (S140). By performing a flick operation along the vertical direction within the scroll area SA1 after separating the indicator away from the surface of the panel 50, it is possible to scroll the list images along the vertical direction (S160, S170, and S175). When the user has found an intended list image, by tapping a position close to a display area of the intended list image, it is possible to restore the number of list images displayed within the scroll area SA1 from four to two (S220). At this time, the intended list image is included in the two list images displayed within the scroll area SAL <Other Modifications>
In S141, S162, S172, and S180, various fashions may be used as a fashion to visually highlight two list images of the four list images displayed within the scroll area SA1. For instance, the two list images may be visually highlighted by differentiating a background color of the two list images from a background color of the other list images. Further, the two list images may be visually highlighted by blinking the two list images or displaying the two list images with a higher density than a density of the other list images.

In S220, various fashions may be used as a fashion to restore the number of list images displayed within the scroll area SA1 from four to two. For instance, an animation process may be performed in which the two list images surrounded by the frame line are gradually enlarged in their display size from a state where the four list images are displayed within the scroll area SA1.

The number of list images displayable within the scroll area SA1 is not limited to "four" or "two" as exemplified in the aforementioned illustrative embodiment, but may be different values.

In the aforementioned illustrative embodiment, the vertical width W2 of each list image after the number of list images displayed within the scroll area SA1 has been increased (see FIG. 7) is half as long as the vertical width W1 of each list image before the number of list images displayed within the scroll area SA1 is increased (see FIG. 6). Nonetheless, the vertical width W2 of each list image may be determined in accordance with a ratio between the number of list images displayable before the number is increased and the number of list images displayable after the number has been increased. For instance, when the number of list images displayable before the number is increased is eight, and the number of list images displayable after the number has been increased is two, the width W2 may be equal to or less than one-fourth of the width W1.

The information displayed in each list image is not limited to the name 102 or the facsimile number 103, but may be various kinds of information.

The loop display flag may not necessarily be set to "ON" or "OFF" depending on the type of the list images, but may be set to "ON" or "OFF" by the user.

In the aforementioned illustrative embodiment, the list images are arranged and scrolled in the y-direction (i.e., the vertical direction). Nonetheless, the list images may be arranged and scrolled in the x-direction (i.e., the horizontal direction).

In the aforementioned illustrative embodiment, the touch keys 52 are electrostatic capacitance type touch sensors. Nonetheless, the touch keys 52 may be configured with various types of structures. For instance, the touch keys 52 may be hard keys.

In the aforementioned illustrative embodiment, aspects of the present disclosure are applied to the MFP 10. Nonetheless, aspects of the present disclosure may be applied to various apparatuses and devices (e.g., mobile phones and notebook PCs) having display screens.

Various kinds of information stored in the ROM 16 and the NVRAM 40 may be stored in an external storage device. Various kinds of processing may be performed after various kinds of information are read out of the external storage device and once stored in the RAM 30. Examples of the external storage device may include a memory card and an external hard disk drive.

What is claimed is:

1. An image display apparatus comprising:
a display;
a memory configured to store a database having M object images registered thereon, the database comprising information as to whether to display each of the M object images, the M object images including first to M-th object images associated with M consecutive registration numbers from 1 to M;
a coordinate detector configured to detect indication coordinates representing a position that an indicator is in touch with or in proximity to within a display area of the display; and
a controller configured to perform a particular process comprising:
based on the database, controlling the display to display N object images among the M object images arranged continuously within a first display area, wherein the first display area is defined within the display area of the display, N is a natural number equal to or more than 2 and less than M, the N object images are associated with N consecutive registration numbers among the M consecutive registration numbers, respectively;
in response to a first operation being detected by the coordinate detector while the N object images are being displayed;
determining K object images including the N object images, wherein K is a natural number more than N, the K object images are associated with K consecutive registration numbers, respectively, and the first operation being for increasing a count of object images displayable within the first display area from N to K;
controlling the display to display the K object images arranged continuously within the first display area;
in response to a second operation being detected by the coordinate detector while the K object images are being displayed:
changing the K object images to a different set of K object images, the second operation being for changing the K object images being displayed within the first display area to the different set of K object images after the count of object images displayable within the first display area has been increased from N to K;
controlling the display to display the different set of K object images arranged continuously within the first display area;
in response to a third operation being detected by the coordinate detector while the K object images or the different set of K object images are being displayed:
extracting N object images from among the K object images or the different set of K object images being displayed, the third operation being for decreasing the count of object images displayable within the first display area from K to N;
controlling the display to display the extracted N object images arranged continuously within the first display area; and
in response to the coordinate detector detecting a tapping operation of tapping a specific object image being displayed, performing a specific process associated with the specific object image that has been tapped.

2. The image display apparatus according to claim 1,
wherein the particular process further comprises:
controlling the display to display a scroll bar image within a second display area, the second display area being defined close to the first display area within the display area of the display, the scroll bar image indicating an association between the first to M-th object images and the N object images; and
in response to the indication coordinates being detected within the scroll bar image, determining that the first operation has been performed.

3. The image display apparatus according to claim 2,
wherein the particular process further comprises:
in response to a movement of the indication coordinates being detected after the indication coordinates have been detected within the scroll bar image, determining that the second operation has been performed;
when the movement of the indication coordinates is detected, changing the K object images to the different set of K object images in accordance with a moving direction and a moving distance of the movement of the indication coordinates; and
in response to the indication coordinates being undetected after the indication coordinates have been detected within the scroll bar image, determining that the third operation has been performed.

4. The image display apparatus according to claim 1,
wherein the particular process further comprises:
controlling the display to visually highlight the N object images extracted from among the K object images or the different set of K object images, while displaying the K object images or the different set of K object images including the extracted N object images; and
controlling the display to display the extracted N object images within the first display area without visually highlighting the extracted N object images.

5. The image display apparatus according to claim 4,
wherein the particular process further comprises:
in response to the third operation being performed after a scroll operation of scrolling object images is performed until the N object images to be extracted are positioned in a middle portion of the different set of K object images being displayed within the first display area, controlling the display to display a visually-highlighted area in a position where the visually-highlighted area encompasses the extracted N object images;

in response to the third operation being performed after the scroll operation is performed up to a terminal end in a first scroll direction until the first object image is displayed within the first display area, controlling the display to move the visually-highlighted area in the first scroll direction to a position where the visually-highlighted area encompasses the first object image; and in response to the third operation being performed after the scroll operation is performed up to a terminal end in a second scroll direction opposite to the first scroll direction until the M-th object image is displayed within the first display area, controlling the display to move the visually-highlighted area in the second scroll direction to a position where the visually-highlighted area encompasses the M-th object image.

6. The image display apparatus according to claim 1,
wherein after a scroll operation of scrolling object images is performed, the N object images to be extracted are positioned in a middle portion of the different set of K object images being displayed within the first display area,
wherein L object images are positioned on a first-direction side of the N object images, and L object images are positioned on a second-direction side of the N object images, L being a number derived from dividing, by two, a number obtained by subtracting N from K,
wherein the first direction and the second direction are along an arrangement direction in which the K object images are arranged, the first direction being opposite to the second direction, and
wherein the particular process further comprises:
when the scroll operation is performed up to a terminal end in the first direction, controlling the display to display the different set of K object images including L blank images, the L blank images being added to the terminal end of the scrolled object images in the first direction; and
when the scroll operation is performed up to a terminal end in the second direction, controlling the display to display the different set of K object images including L blank images, the L blank images being added to the terminal end of the scrolled object images in the second direction.

7. The image display apparatus according to claim 1,
wherein each of the first to M-th object images has identification information for identifying each object image, and accompanying information associated with the identification information, and
wherein the particular process further comprises:
when a count of object images displayable within the first display area is N, controlling the display to display the N object images or the extracted N object images each of which shows the identification information and the accompanying information thereof; and
when the count of object images displayable within the first display area is K, controlling the display to display the K object images or the different set of K object images each of which shows the identification information thereof.

8. The image display apparatus according to claim 1,
wherein the particular process further comprises:
in response to the first operation being detected by the coordinate detector while the N object images are being displayed, changing a count of object images displayable within the first display area from N to K, and determining the K object images including the N object images; and in response to the third operation being detected by the coordinate detector while the K object images or the different set of K object images are being displayed, changing the count of object images displayable within the first display area from K to N, and extracting the N object images from among the K object images or the different set of K object images at the point of time when the third operation is input.

9. The image display apparatus according to claim 1,
wherein the controller comprises:
a processor; and
a memory storing processor-executable instructions configured to, when executed by the processor, cause the processor to perform the particular process.

10. A method implementable on a processor connected with an image display apparatus, the image display apparatus comprising:
a display;
a memory configured to store a database having M object images registered thereon, the database comprising information as to whether to display each of the M object images, the M object images including first to M-th object images associated with M consecutive registration numbers from 1 to M; and
a coordinate detector configured to detect indication coordinates representing a position that an indicator is in touch with or in proximity to within a display area of the display, the method comprising:
controlling, based on the database, the display to display N object images among the M object images arranged continuously within a first display area, wherein the first display area is defined within the display area of the display, N is a natural number equal to or more than 2 and less than M, the N object images are associated with N consecutive registration numbers among the M consecutive registration numbers, respectively;
in response to a first operation being detected by the coordinate detector while the N object images are being displayed;
determining K object images including the N object images, wherein K is a natural number more than N, the K object images are associated with K consecutive registration numbers, respectively, and the first operation being for increasing a count of object images displayable within the first display area from N to K;
controlling the display to display the K object images arranged continuously within the first display area;
in response to a second operation being detected by the coordinate detector while the K object images are being displayed;
changing the K object images to a different set of K object images, the second operation being for changing the K object images being displayed within the first display area to the different set of K object images after the count of object images displayable within the first display area has been increased from N to K;
controlling the display to display the different set of K object images arranged continuously within the first display area;
in response to a third operation being detected by the coordinate detector while the K object images or the different set of K object images are being displayed;

extracting N object images from among the K object images or the different set of K object images being display, the third operation being for decreasing the count of object images displayable within the first display area from K to N;

controlling the display to display the extracted N object images arranged continuously within the first display area; and in response to the coordinate detector detecting a tapping operation of tapping a specific object image being displayed, performing a specific process associated with the specific object image that has been tapped.

11. A non-transitory computer-readable medium storing computer-readable instructions that are executable by a processor connected with an image display apparatus, the image display apparatus comprising:

a display;

a memory configured to store a database having M object images registered thereon, the database comprising information as to whether to display each of the M object images, the M object images including first to M-th object images associated with M consecutive registration numbers from 1 to M; and a coordinate detector configured to detect indication coordinates representing a position that an indicator is in touch with or in proximity to within a display area of the display, the instructions being configured to, when executed, cause the processor to perform a particular process comprising:

based on the database, controlling the display to display N object images among the M object images arranged continuously within a first display area, wherein the first display area is defined within the display area of the display, N is a natural number equal to or more than 2 and less than M, the N object images are associated with N consecutive registration numbers among the M consecutive registration numbers, respectively;

in response to a first operation being detected by the coordinate detector while the N object images are being displayed;

determining K object images including the N object images, wherein K is a natural number more than N, the K object images are associated with K consecutive registration numbers, respectively, and the first operation being for increasing a count of object images displayable within the first display area from N to K;

controlling the display to display the K object images arranged continuously within the first display area;

in response to a second operation being detected by the coordinate detector while the K object images are being displayed;

changing the K object images to another set of K object images, the second operation being for changing the K object images being displayed within the first display area to the different set of K object images after the count of object images displayable within the first display area has been increased from N to K;

controlling the display to display the different set of K object images arranged continuously within the first display area;

in response to a third operation being detected by the coordinate detector while the K object images or the different set of K object images are being displayed;

extracting N object images from among the K object images or the different set of K object images being displayed, the third operation being for decreasing the count of object images displayable within the first display area from K to N;

controlling the display to display the extracted N object images arranged continuously within the first display area; and in response to the coordinate detector detecting a tapping operation of tapping a specific object image being displayed, performing a specific process associated with the specific object image that has been tapped.

12. The non-transitory computer-readable medium according to claim 11, wherein the particular process further comprises:

controlling the display to display a scroll bar image within a second display area, the second display area being defined close to the first display area within the display area of the display, the scroll bar image indicating an association between the first to M-th object images and the N object images; and in response to the indication coordinates being detected within the scroll bar image, determining that the first operation has been performed.

13. The non-transitory computer-readable medium according to claim 12, wherein the particular process further comprises:

in response to a movement of the indication coordinates being detected after the indication coordinates have been detected within the scroll bar image, determining that the second operation has been performed;

when the movement of the indication coordinates is detected, changing the K object images to the different set of K object images in accordance with a moving direction and a moving distance of the movement of the indication coordinates; and in response to the indication coordinates being undetected after the indication coordinates have been detected within the scroll bar image, determining that the third operation has been performed.

14. The non-transitory computer-readable medium according to claim 11, wherein the particular process further comprises:

controlling the display to visually highlight the N object images extracted from among the K object images or the different set of K object images, while displaying the K object images or the different set of K object images including the extracted N object images; and controlling the display to display the extracted N object images within the first display area without visually highlighting the extracted N object images.

15. The non-transitory computer-readable medium according to claim 14, wherein the particular process further comprises:

in response to the third operation being performed after a scroll operation of scrolling object images is performed until the N object images to be extracted are positioned in a middle portion of the different set of K object images displayed within the first display area, controlling the display to display a visually-highlighted area in a position where the visually-highlighted area encompasses the extracted N object images;

in response to the third operation being performed after the scroll operation is performed up to a terminal end in a first scroll direction until the first object image is displayed within the first display area, controlling the display to move the visually-highlighted area in the first scroll direction to a position where the visually-highlighted area encompasses the first object image; and in response to the third operation being performed after the scroll operation is performed up to a terminal end in a second scroll direction opposite to the first scroll direction until the M-th object image is displayed within the first display area, controlling the display to move the visually-highlighted area in the second scroll direction to a position where the visually-highlighted area encompasses the M-th object image.

16. The non-transitory computer-readable medium according to claim 11,
wherein after a scroll operation of scrolling object images is performed, the N object images to be extracted are positioned in a middle portion of the different set of K object images being displayed within the first display area,
wherein L object images are positioned on a first-direction side of the N object images, and L object images are positioned on a second-direction side of the N object images, L being a number derived from dividing, by two, a number obtained by subtracting N from K,
wherein the first direction and the second direction are along an arrangement direction in which the K object images are arranged, the first direction being opposite to the second direction, and
wherein the particular process further comprises:
when the scroll operation is performed up to a terminal end in the first direction, controlling the display to display the different set of K object images including L blank images, the L blank images being added to the terminal end of the scrolled object images in the first direction; and
when the scroll operation is performed up to a terminal end in the second direction, controlling the display to display the different set of K object images including L blank images, the L blank images being added to the terminal end of the scrolled object images in the second direction.

17. The non-transitory computer-readable medium according to claim 11,
wherein each of the first to M-th object images has identification information for identifying each object image, and accompanying information associated with the identification information, and
wherein the particular process further comprises:
when a count of object images displayable within the first display area is N, controlling the display to display the N object images or the extracted N object images each of which shows the identification information and the accompanying information thereof; and
when the count of object images displayable within the first display area is K, controlling the display to display the K object images or the different set of K object images each of which shows the identification information thereof.

18. The non-transitory computer-readable medium according to claim 11,
wherein the particular process further comprises:
in response to the first operation being detected by the coordinate detector while the N object images are being displayed, changing a count of object images displayable within the first display area from N to K, and determining the K object images including the N object images; and
in response to the third operation being detected by the coordinate detector while the K object images or the different set of K object images are being displayed, changing the count of object images displayable within the first display area from K to N, and extracting the N object images from among the K object images or the different set of K object images at the point of time when the third operation is input.

* * * * *